US008317585B2

(12) United States Patent
Gomez

(10) Patent No.: US 8,317,585 B2

(45) Date of Patent: Nov. 27, 2012

(54) WAGERING GAME TRIGGERING MECHANISM FOR USE WITH MULTI-LEVEL PROGRESSIVE GAME

(75) Inventor: Benjamin T. Gomez, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 524 days.

(21) Appl. No.: 12/447,083

(22) PCT Filed: Oct. 10, 2007

(86) PCT No.: PCT/US2007/021601

§ 371 (c)(1),
(2), (4) Date: Apr. 24, 2009

(87) PCT Pub. No.: WO2008/063297

PCT Pub. Date: May 29, 2008

(65) Prior Publication Data

US 2010/0093422 A1 Apr. 15, 2010

Related U.S. Application Data

(60) Provisional application No. 60/854,544, filed on Oct. 26, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................ 463/16; 463/20; 463/21; 463/26; 463/27

(58) Field of Classification Search ..................... 463/16
See application file for complete search history.

(56) References Cited

U.S. PATENT DOCUMENTS 4,837,728 A 6/1989 Barrie et al. ................. 364/412
(Continued)

FOREIGN PATENT DOCUMENTS

GB 2313792 A 12/1997
(Continued)

OTHER PUBLICATIONS

Strictly Slots Magazine, "*Jackpot Deluxe*"; p. 54; May 2007 (1 page).
(Continued)

*Primary Examiner* — Michael Cuff
*Assistant Examiner* — Kevin Y Kim
(74) *Attorney, Agent, or Firm* — Nixon Peabody LLP

(57) ABSTRACT

According to one aspect of the present invention, a method of conducting a wagering game is provided. The method allows an opportunity to achieve a first progressive award and a second progressive award. The method comprises the acts of receiving a primary wager from a player for playing the wagering game and initiating the wagering game. The method further includes the act of displaying a randomly selected outcome of the wagering game via a plurality of symbols. The plurality of symbols are selected from a set of symbols including a predetermined symbol. In response to the randomly selected outcome including a first number of the predetermined symbols, the method includes the act of triggering an event in which the first progressive award can be achieved. In response to the randomly selected outcome including a second number of the predetermined symbols, the method includes the act of triggering an event in which the second progressive award can be achieved.

22 Claims, 10 Drawing Sheets

U.S. PATENT DOCUMENTS

| | | | | | |
|---|---|---|---|---|---|
| 4,861,041 | A | | 8/1989 | Jones et al. | 273/292 |
| 5,116,055 | A | | 5/1992 | Tracy | 273/138 A |
| 5,249,800 | A | | 10/1993 | Hilgendorf et al. | 273/138 A |
| 5,280,909 | A | | 1/1994 | Tracy | 273/138 A |
| 5,344,144 | A | | 9/1994 | Canon | 273/138 A |
| 5,417,430 | A | | 5/1995 | Breeding | 273/292 |
| 5,564,700 | A | | 10/1996 | Celona | 463/27 |
| 5,611,730 | A | | 3/1997 | Weiss | 463/20 |
| 5,645,486 | A | * | 7/1997 | Nagao et al. | 463/27 |
| 5,647,592 | A | | 7/1997 | Gerow | 273/139 |
| 5,655,961 | A | | 8/1997 | Acres et al. | 463/27 |
| 5,766,076 | A | | 6/1998 | Pease et al. | 463/27 |
| 5,851,147 | A | | 12/1998 | Stupak et al. | 463/13 |
| 5,876,284 | A | | 3/1999 | Acres et al. | 463/25 |
| 5,885,158 | A | | 3/1999 | Torango et al. | 463/27 |
| 5,941,773 | A | | 8/1999 | Harlick | 463/26 |
| 5,944,606 | A | | 8/1999 | Gerow | 463/27 |
| 5,951,011 | A | | 9/1999 | Potter et al. | 273/292 |
| 6,032,955 | A | | 3/2000 | Luciano et al. | 273/138.1 |
| 6,089,980 | A | | 7/2000 | Gauselmann | 463/27 |
| 6,102,799 | A | | 8/2000 | Stupak | 463/27 |
| 6,110,043 | A | | 8/2000 | Olsen | 463/27 |
| 6,203,010 | B1 | | 3/2001 | Jorash et al. | 273/138.1 |
| 6,210,275 | B1 | | 4/2001 | Olsen | |
| 6,217,448 | B1 | | 4/2001 | Olsen | 463/25 |
| 6,224,482 | B1 | | 5/2001 | Bennett | 463/20 |
| 6,224,484 | B1 | | 5/2001 | Okuda et al. | 463/27 |
| 6,231,445 | B1 | | 5/2001 | Acres | 463/42 |
| 6,241,608 | B1 | | 6/2001 | Torango | 463/27 |
| 6,336,862 | B1 | | 1/2002 | Byrne | 463/27 |
| 6,358,149 | B1 | | 3/2002 | Schneider et al. | 463/27 |
| 6,416,409 | B1 | | 7/2002 | Jordan | 463/27 |
| 6,431,983 | B2 | | 8/2002 | Acres | 463/25 |
| 6,589,115 | B2 | | 7/2003 | Walker et al. | 463/25 |
| 6,592,458 | B1 | | 7/2003 | Ho | 463/17 |
| 6,599,188 | B2 | | 7/2003 | Hirsch et al. | 463/19 |
| 6,599,193 | B2 | | 7/2003 | Baerlocher et al. | 463/27 |
| 6,656,052 | B2 | | 12/2003 | Abramopoulos et al. | 463/47 |
| 6,676,513 | B2 | | 1/2004 | Gauselmann | 463/20 |
| 6,712,695 | B2 | | 3/2004 | Mothwurf et al. | 463/25 |
| 6,776,715 | B2 | | 8/2004 | Price | 463/27 |
| 6,887,154 | B1 | | 5/2005 | Luciano, Jr. et al. | 463/26 |
| 7,004,466 | B2 | | 2/2006 | Gauselmann | 273/139 |
| 7,056,215 | B1 | | 6/2006 | Olive | 463/27 |
| 2003/0027625 | A1 | | 2/2003 | Rowe | 463/20 |
| 2003/0181231 | A1 | | 9/2003 | Vancura et al. | 463/9 |
| 2003/0211884 | A1 | | 11/2003 | Gauselmann | 463/26 |
| 2003/0222402 | A1 | | 12/2003 | Olive | 273/292 |
| 2003/0228899 | A1 | | 12/2003 | Evans | 463/25 |
| 2003/0236116 | A1 | | 12/2003 | Marks et al. | 463/16 |
| 2004/0009808 | A1 | | 1/2004 | Gauselmann | 463/25 |
| 2004/0023716 | A1 | | 2/2004 | Gauselmann | 463/26 |
| 2004/0038741 | A1 | | 2/2004 | Gauselmann | 463/26 |
| 2004/0048644 | A1 | | 3/2004 | Gerrard et al. | 463/16 |
| 2004/0092304 | A1 | | 5/2004 | George et al. | 463/29 |
| 2005/0003880 | A1 | * | 1/2005 | Englman et al. | 463/16 |
| 2005/0054434 | A1 | | 3/2005 | Baerlocher et al. | 463/25 |
| 2005/0055113 | A1 | | 3/2005 | Gauselmann | 700/91 |
| 2005/0059467 | A1 | | 3/2005 | Saffari et al. | 463/19 |
| 2005/0059472 | A1 | | 3/2005 | Joshi et al. | 463/20 |
| 2005/0059481 | A1 | * | 3/2005 | Joshi et al. | 463/27 |
| 2005/0064930 | A1 | | 3/2005 | Jubinville et al. | 463/17 |
| 2005/0096130 | A1 | | 5/2005 | Mullins | 463/27 |
| 2005/0137010 | A1 | | 6/2005 | Enzminger et al. | 463/25 |
| 2005/0192088 | A1 | | 9/2005 | Hartman et al. | 463/27 |
| 2005/0215313 | A1 | | 9/2005 | O'Halloran | 463/26 |
| 2006/0003829 | A1 | | 1/2006 | Thomas | 463/20 |
| 2006/0019737 | A1 | | 1/2006 | Yang | 463/19 |
| 2006/0025195 | A1 | | 2/2006 | Pennington et al. | 463/16 |
| 2006/0025210 | A1 | | 2/2006 | Johnson | 463/25 |
| 2006/0030403 | A1 | | 2/2006 | Lafky et al. | |
| 2006/0052159 | A1 | | 3/2006 | Cahill et al. | 463/27 |
| 2006/0073887 | A1 | | 4/2006 | Nguyen et al. | 463/27 |
| 2006/0073889 | A1 | | 4/2006 | Edidin et al. | 463/27 |
| 2006/0116201 | A1 | | 6/2006 | Gauselmann | 463/26 |
| 2006/0142079 | A1 | | 6/2006 | Ikehara et al. | 463/27 |
| 2006/0142086 | A1 | | 6/2006 | Blackburn et al. | 463/42 |
| 2006/0154718 | A1 | | 7/2006 | Willyward et al. | 463/25 |
| 2006/0178203 | A1 | | 8/2006 | Hughes et al. | 463/20 |
| 2006/0183535 | A1 | * | 8/2006 | Marks et al. | 463/20 |
| 2006/0183537 | A1 | | 8/2006 | Dickerson | 463/27 |
| 2006/0183538 | A1 | | 8/2006 | Michaelson et al. | 463/27 |
| 2006/0281527 | A1 | | 12/2006 | Dunaevsky et al. | 463/20 |
| 2006/0287077 | A1 | | 12/2006 | Grav et al. | 463/27 |
| 2007/0026941 | A1 | | 2/2007 | Block et al. | 463/29 |
| 2007/0054733 | A1 | | 3/2007 | Baerlocher | 463/27 |
| 2007/0060244 | A1 | | 3/2007 | Yaldoo et al. | 463/16 |
| 2007/0060271 | A1 | | 3/2007 | Cregan et al. | 463/16 |
| 2007/0060314 | A1 | | 3/2007 | Baerlocher et al. | 463/25 |
| 2007/0060319 | A1 | | 3/2007 | Block et al. | 463/27 |
| 2007/0060365 | A1 | | 3/2007 | Tien et al. | 463/42 |
| 2007/0184887 | A1 | * | 8/2007 | Cannon | 463/16 |
| 2007/0213114 | A1 | * | 9/2007 | Caspers et al. | 463/16 |
| 2007/0259711 | A1 | | 11/2007 | Thomas | 463/22 |
| 2008/0015005 | A1 | | 1/2008 | Yaldoo et al. | 463/16 |
| 2008/0015012 | A1 | | 1/2008 | Englman et al. | 463/25 |
| 2008/0108410 | A1 | | 5/2008 | Baerlocher | 463/20 |
| 2008/0113770 | A1 | | 5/2008 | Gelber et al. | 463/25 |
| 2011/0003636 | A1 | * | 1/2011 | Thomas et al. | 463/27 |

FOREIGN PATENT DOCUMENTS

| | | | |
|---|---|---|---|
| WO | WO 99/03078 | | 1/1999 |
| WO | WO 01/33478 | A1 | 5/2001 |
| WO | WO 2005/032675 | A2 | 4/2005 |
| WO | WO 2005/099425 | A2 | 10/2005 |
| WO | WO 2006/014990 | A2 | 2/2006 |
| WO | WO 2006/039349 | A2 | 4/2006 |
| WO | WO 2006/130597 | A2 | 12/2006 |
| WO | WO 2006/130611 | A2 | 12/2006 |
| WO | WO 2007/028108 | A2 | 3/2007 |
| WO | WO 2007/117502 | A2 | 10/2007 |
| WO | WO 2007/123858 | A2 | 11/2007 |
| WO | WO 2008/005366 | A2 | 1/2008 |
| WO | WO 2008/021449 | A2 | 2/2008 |
| WO | WO 2008/039403 | A2 | 4/2008 |
| WO | WO 2008/057356 | A2 | 5/2008 |
| WO | WO 2008/063297 | A2 | 5/2008 |
| WO | WO 2008/063394 | A2 | 5/2008 |

OTHER PUBLICATIONS

Lottery Insider, "*Aristocrat Unveils the Evolution of Hyperlink With Jackpot Deluxe*!"; vol. 39 No. 4; Apr. 23, 2007 (1 page).

VegasNews.com, "Aristocrat Unveils Jackpot Deluxe With Hyperlink", Mar. 29, 2007 (3 pages).

International Search Report for PCT Application No. PCT/US2007/009195 dated Jun. 13, 2008 (2 pages).

Written Opinion of the International Searching Authority for PCT Application No. PCT/US2007/009195 dated Jun. 13, 2008 (5 pages).

International Search Report for PCT Application No. PCT/US2007/021601 dated Aug. 8, 2008 (2 pages).

Written Opinion of the International Searching Authority for PCT Application No. PCT/US2007/021601 dated Aug. 8, 2008 (5 pages).

* cited by examiner

WAGERING GAME TRIGGERING MECHANISM FOR USE WITH MULTI-LEVEL PROGRESSIVE GAME

CROSS REFERENCE TO RELATED APPLICATIONS

This application is a U.S. national stage of International Application No. PCT/US2007/021601, filed Oct. 10, 2007, which is related to and claims priority from U.S. Provisional Application No. 60/854,544, filed Oct. 26, 2006, which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a wagering game with a multi-level bonus game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines.

Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game and progressive award concepts offers tremendous advantages in player appeal and excitement relative to other known games, and because such games are attractive to both players and operators, there is a continuing need to develop gaming machines with new types of bonus games to satisfy the demands of players and operators.

Recent advances in transmissive display technology have made it possible to more easily modify the appearance of a mechanical display. The transmissive display is essentially a transparent video display that is superimposed over the mechanical display. The transmissive display is then operated to display selected video images superimposed over the mechanical display. The video images may include translucent portions so that the underlying mechanical display is visible, but in an altered state (i.e., different color, texture, etc.). The video images may also include opaque portions so as to completely block out the underlying mechanical display. For information regarding the use of transmissive display technology in gaming machines and for embodiments employing transmissive displays, the reader is referred to commonly-assigned U.S. Published Application No. 20040198485, titled "Gaming Machine with Superimposed Display Image," filed on Nov. 7, 2003, and to commonly-assigned U.S. Pat. No. 6,517,433, titled "Reel Spinning slot Machine With Superimposed Video Image," issued on Feb. 11, 2003, each of which being incorporated herein by reference in its entirety.

The above-described transmissive display technology gives wagering game designers the capability and flexibility to more easily design and modify the appearance of mechanical displays and video displays. Accordingly, there is a need to develop new and improved wagering games for mechanical displays using this technology, with features that take full advantage of the capabilities of the transmissive display to thereby enhance the entertainment value of the wagering games.

SUMMARY OF THE INVENTION

According to one aspect of the present invention, a method of conducting a wagering game is provided. The method allows an opportunity to achieve a first progressive award and a second progressive award. The method comprises the acts of receiving a primary wager from a player for playing the wagering game and initiating the wagering game. The method further includes the act of displaying a randomly selected outcome of the wagering game via a plurality of symbols. The plurality of symbols are selected from a set of symbols including a predetermined symbol. In response to the randomly selected outcome including a first number of the predetermined symbols, the method includes the act of triggering an event in which the first progressive award can be achieved. In response to the randomly selected outcome including a second number of the predetermined symbols, the method includes the act of triggering an event in which the second progressive award can be achieved.

According to another aspect of the present invention, a method of conducting a wagering game associated with a plurality of progressive award levels is provided. The method includes the acts of receiving a primary wager and initiating a basic game of the wagering game. The method further includes the act of displaying a plurality of symbols arranged in an array. The plurality of symbols are selected from a set of symbols including at least one predetermined symbol. The method additionally includes the act of initiating a bonus game if at least a threshold number of the predetermined symbol is displayed. The bonus game provides an opportunity to achieve a level of the plurality of progressive award levels based on the number of displayed predetermined symbols in the basic game.

According to yet an additional aspect of the present invention, a gaming system for playing a wagering game is provided. The gaming system allows an opportunity to achieve a plurality of progressive award levels. The gaming system comprises a wager input device for receiving a primary wager to play a game of the wagering game. The gaming system also includes a display for displaying a randomly selected outcome of the game. The randomly selected outcome is indicated by a plurality of symbols arranged in an array. The plurality of symbols are selected from a set of symbols and at least one of the symbols in the set is a predetermined symbol. The opportunity to achieve a level of the plurality of progressive award levels is based on a number of the predetermined symbols being displayed in the randomly selected outcome. The progressive award level corresponds to the determined number of the predetermined symbol.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
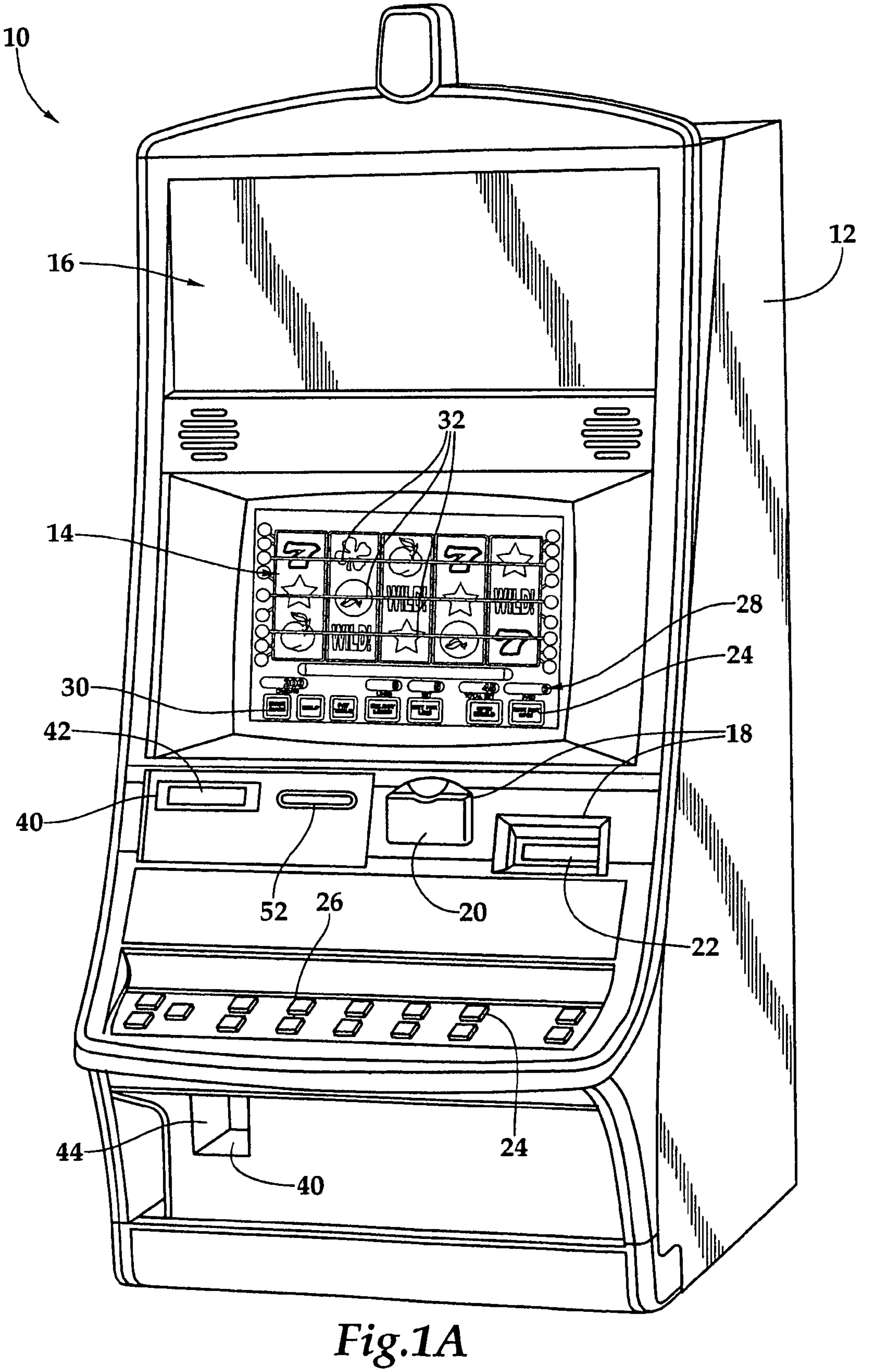
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, and optionally using transmissive LCD technology as described above, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
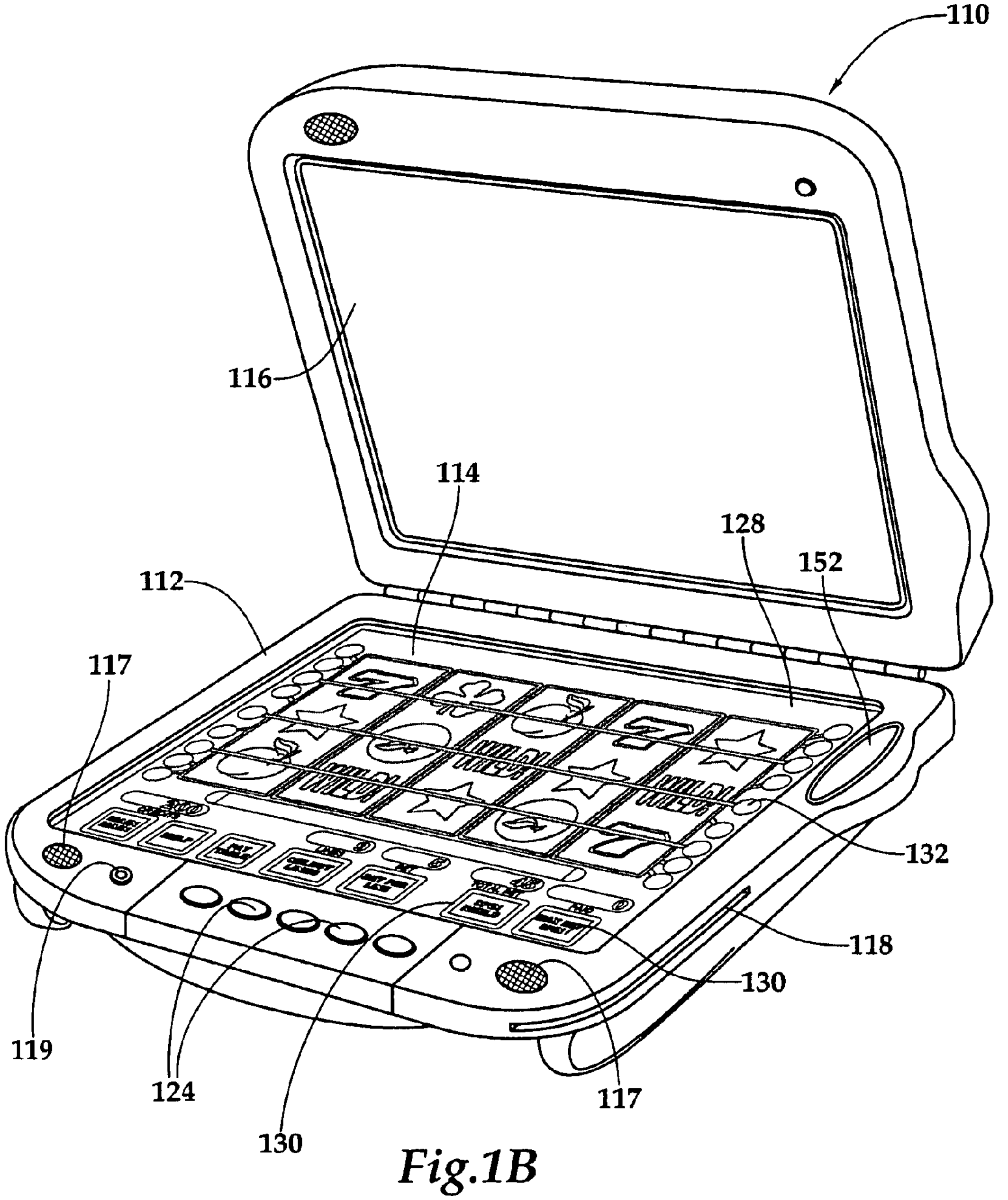
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
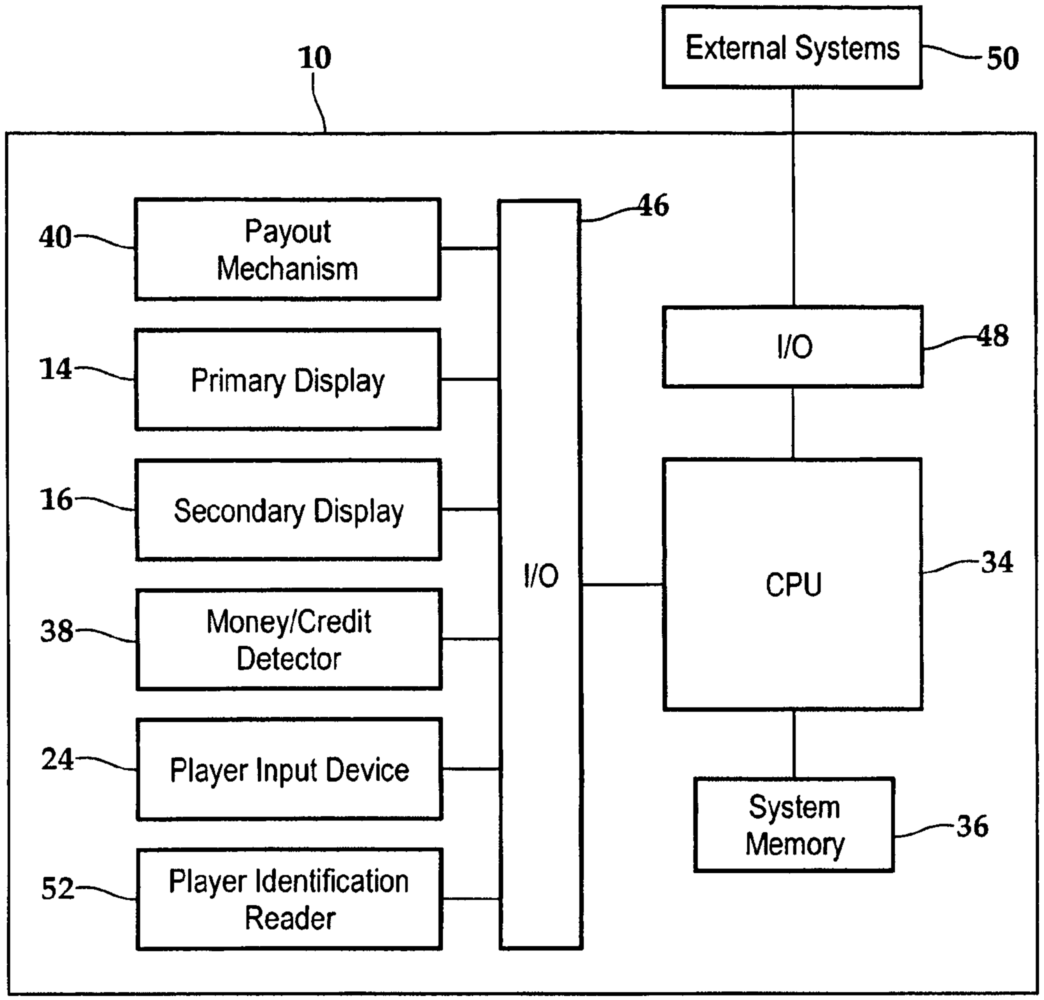
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
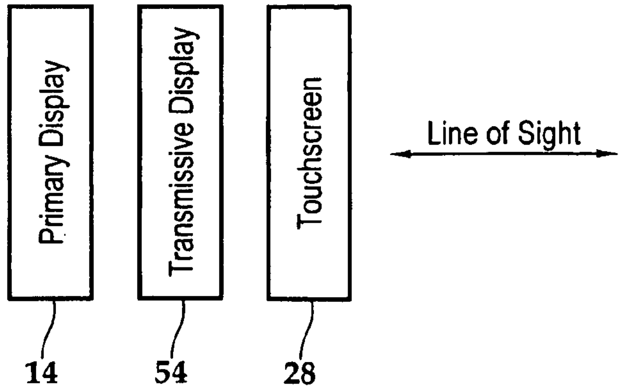
FIG. 3 is block diagram of a transmissive display superimposed on a primary/secondary display of a gaming machine.

FIG. 3 illustrates a block diagram of the gaming machine 10 where a transmissive display 54 has been superimposed on the primary display 14. The transmissive display 54 may be a transmissive liquid crystal display (LCD) or any other suitable transmissive display and is positioned directly in the player's line of sight as he or she views the primary display 14. In some embodiments, the touch screen 28 is then mounted over the transmissive display 54 in the player's line of sight. The transmissive display 54 provides video images that may be selectively made transparent, semi-transparent (i.e., translucent), or opaque in selected places. This allows preselected images on the transmissive display 54 to be displayed over certain portions of the primary display 14, with the result that certain areas of the primary display 14 are either altered in some way (e.g., highlighted, colored, etc.), or completely blocked by the images on the transmissive display 54. All video images on the transmissive display may be rendered in two-dimensional or three-dimensional graphics (e.g., using Flash Macromedia™). The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using the transmissive display 54 in this way allows numerous types of improvements and enhancements to be made to the appearance of the display 14 in real time and during on-going game play.

Thus far, the transmissive display 54 has only been described as being superimposed on the primary display 14. It is also possible, however, to superimpose the transmissive display 54 on the secondary display 16 as well without departing from the scope of the invention. Still, in most embodiments, the primary display 14 is the one with the transmissive display 54 superimposed thereon. The reason for this is because in gaming machines 10 that involve the transmissive display 54, most of the time the primary display 14 is a mechanical display, such as mechanical reels (e.g., for a slot machine), a mechanical wheel (e.g., a roulette game), one or more dice, a pachinko board, or other board game. In alternative embodiments, however, the primary display 14 may be a video based display such as a CRT or LCD. In further alternative embodiments, the primary display 14 may be a diorama presenting a three-dimensional model of a game environment. The diorama may be stationary in some implementations, or it may slide or move around in one or more dimensions. In addition to FIG. 3, other embodiments that involve the transmissive display technology are set forth in U.S. Published Application No. 20040198485 and U.S. Pat. No. 6,517,433, each of which is incorporated by reference in its entirety.

Figure 4:
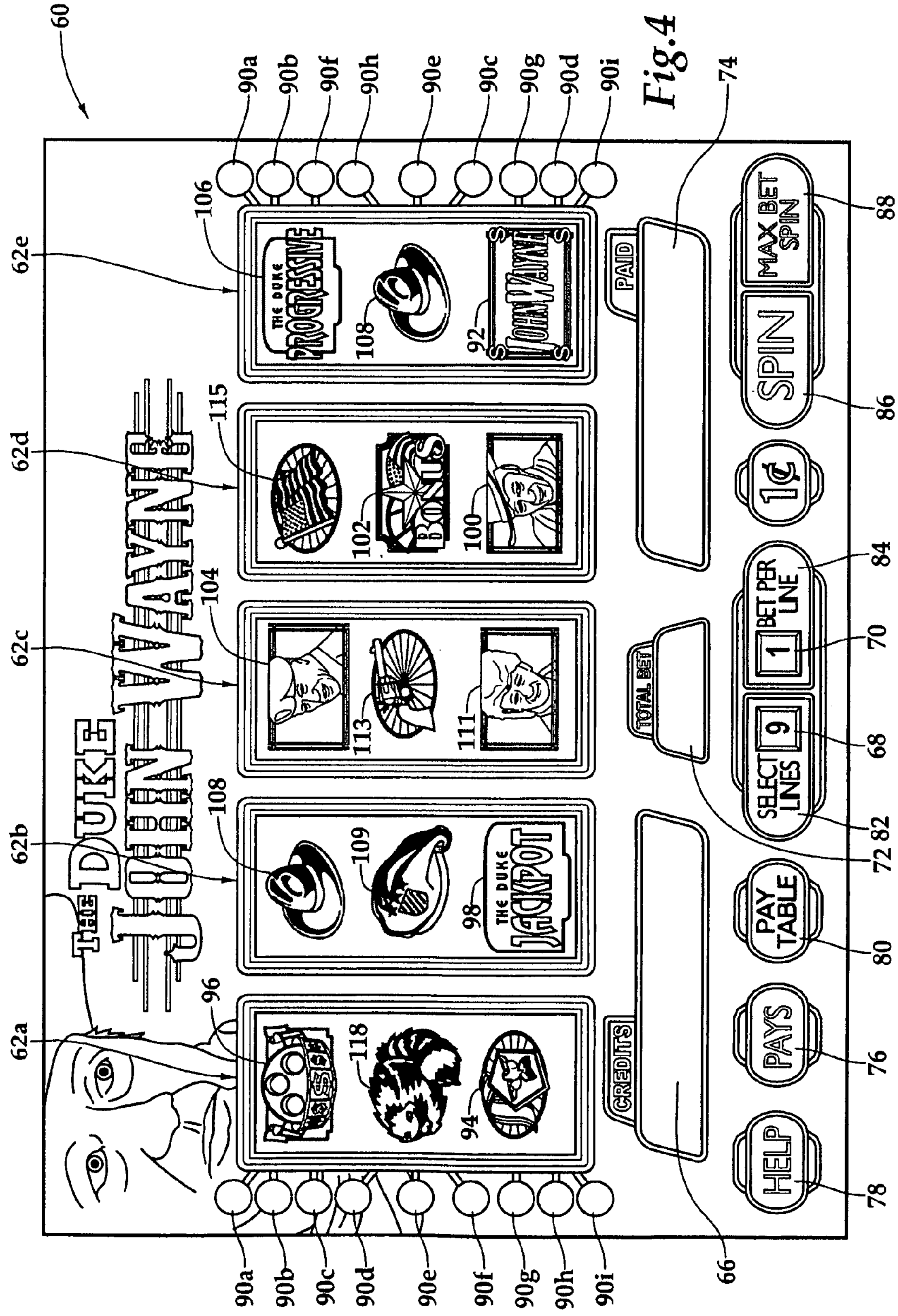
FIG. 4 is a screen view of a basic game capable of being displayed on the gaming machines of FIGS. 1*a* and 1*b*.

Turning now to FIG. 4, an image of a main game screen 60 is illustrated, according to one embodiment of the present invention. A player begins play of a basic wagering game by inserting a wager into the value input device 18 of the gaming machine 10. A player can select play by using the player input device 24, via the buttons 26 or the touch screen keys 30. The CPU 34 (or a wagering game control network in alternative embodiments) operates to execute a wagering game program causing the primary display 14 to display the wagering game that includes a plurality of visual elements.

The basic game screen 60 may be displayed on the primary display 14 or on a portion thereof. In the illustrated embodiment, the basic game screen 60 is used to display a plurality of simulated, movable reels 62*a-e* with symbols displayed thereon. The reels 62*a-e* are positioned such that the symbols are displayed relative to at least one payline 32 (FIG. 1*a*), yielding a plurality of outcomes for the basic game. The basic game screen 60 may also display a plurality of game session meters and various buttons selectable by a player. The game session meters include a "credit" meter 66 for displaying a number of credits available for play on the machine; a "lines" meter 68 for displaying a number of paylines to be played by a player on the machine; a "line bet" meter 70 for displaying a number of credits wagered (e.g., from 1 to 5 credits) for each of the number of paylines played; a "total bet" meter 72 for displaying a total number of credits wagered for the particular round of wagering; and a "paid" meter 74 for displaying an amount to be awarded based on the results of the particular round of wagering. The user-selectable buttons include a "pays" button 76 to collect the credits remaining in the credits meter 66; a "help" button 78 for viewing instructions on how to play the wagering game; a "pay table" button 80 for viewing a pay table associated with the basic wagering game; a "select lines" button 82 for changing the number of paylines (displayed in the lines meter 68) a player wishes to play; a "bet per line" button 84 for changing the amount of the wager which is displayed in the line bet meter 70; a "spin" button 86 for moving the reels 62*a-e*; and a "max bet spin" button 88 for wagering a maximum number of credits and moving the reels 62*a-e* of the basic wagering game. While the gaming machine 10, 110 allows for these types of player inputs, the present invention does not require them and can be used on gaming terminals having more, less, or different player inputs.

In FIG. 4, the five depicted reels 62*a-e* have a plurality of symbols displayed thereon and at least one activated payline extending from one of the payline indicators 90*a-i* on the left side of the screen 60 to the corresponding payline indicators 90*a-i* on the right side of the screen 60. The plurality of symbols displayed on the reels 62*a-e* are used to indicate a plurality of possible outcomes along each of the activated paylines. The depicted symbols generally correspond to a "JOHN WAYNE" theme and include: "MONEY" symbols 92; "EAGLE BADGE" symbols 94; "GOLD MOVIE REEL" symbols 96; "DUKE JACKPOT" symbols 98; "JOHN WAYNE COWBOY" symbols 100; "BONUS" symbols 102; "JOHN WAYNE BERET" symbols 104; "DUKE PROGRESSIVE" symbols 106; "COWBOY HAT" symbols 108; "BERET" symbols 109; "JOHN WAYNE COON HAT" symbols 111; "GUN" symbols 113; "AMERICAN FLAG" symbols 115; and "COON HAT" symbols 120. Other JOHN WAYNE-themed symbols may also be depicted. In other embodiments of the present invention, the gaming machine 10, 110 may portray other themes with corresponding like-themed symbols. Further, standard gaming symbols such as "1-BAR" symbols, "2-BAR" symbols, "3-BAR" symbols, "CHERRY" symbols, "SEVEN" symbols, and "BELL" symbols may be depicted on the reels 62*a-e* in other embodiments. The reels 62*a-e* displaying these symbols may be either traditional mechanical reels or they may be computer-generated images of reels.

A winning combination occurs when the symbols appearing on the reels 62*a-e* along an active payline correspond to one of the winning symbol combinations listed in a pay table stored in the system memory 36 of the gaming machine 10, 110. The pay table may also be displayed on the secondary display 16, the primary display 14, or both and be either displayed constantly, intermittently, or upon request by a player (e.g., by selecting the pay-table button 80). Winning combinations listed in the pay table can include three like-symbols appearing on a payline yielding a first payout, four like-symbols appearing on a payline yielding a second, larger payout, and five like-symbols appearing on a payline yielding a third, even larger payout.

A player may play multiple paylines by selecting the select-lines button 82 until the desired number of paylines (up to nine in the illustrated embodiment) are displayed. While an embodiment with nine paylines is shown, a gaming machine 10, 110 with a single payline, or multiple paylines will also work with the present invention. Additionally, although an embodiment with five reels is shown, a gaming machine 10 with any plurality of reels may also be used in accordance with the present invention.

In a typical gaming scenario, a portion of players' wager amount at the gaming machines (e.g., 10) is used to fund a wide area progressive jackpot. A wide area progressive jackpot is typically linked to gaming machines across multiple casino properties. As players continue to play on the widely linked gaming machines, the wide area progressive jackpot continues to increase based on the received wagering amounts of the players. Eventually, the wide area progressive jackpot may be reset to an initial value. This would happen if, for example, the wide area progressive jackpot was awarded. In one embodiment, five DUKE PROGRESSIVE 106 symbols appearing along an active payline triggers the wide area progressive jackpot. It is contemplated that other symbol combinations may also trigger the wide area progressive jackpot.

Additionally, in a typical gaming scenario, a portion of players' wager amount at the gaming machines (e.g., 10) is used to fund a local area progressive jackpot. A local area progressive jackpot is typically linked to gaming machines within a single casino property. As players continue to play on the locally linked gaming machines, the local area progressive jackpot continues to increase based on the received wagering amounts of the players. Eventually, the local area progressive jackpot may be reset to an initial value. This would happen if, for example, the local area progressive jackpot was awarded. A local area progressive jackpot award or bonus game providing an opportunity to earn a local area progressive jackpot award may be triggered by a certain symbol combination in the basic game.

In one embodiment, three or more scattered BONUS symbols 102 trigger the bonus game providing an opportunity to earn a local area progressive jackpot. Thus, the bonus game may be triggered in response to the number of a predetermined symbol (e.g., BONUS symbols 102) appearing anywhere (i.e., scattered) on the display 60 being equal to or greater than a threshold number (e.g., three). Different symbol combinations trigger different levels of local area progressives that may be earned in the bonus game. For example, three BONUS symbols 102 trigger a low-level local area progressive bonus game that may yield a first payout, four BONUS symbols 102 trigger a mid-level local area progressive bonus game that may yield a second, larger payout, and five BONUS symbols 102 trigger a high-level local area progressive bonus game that may yield a third, even larger payout. Thus, in this example, the level of the local area progressive that a player is eligible to achieve is dependent upon the number of BONUS symbols 102 appearing on the main display 60 after a play of the basic game. More generally, the level of local area progressive award that a player is eligible to earn is dependent on the number of symbols appearing in the triggering mechanism.

Figure 5:
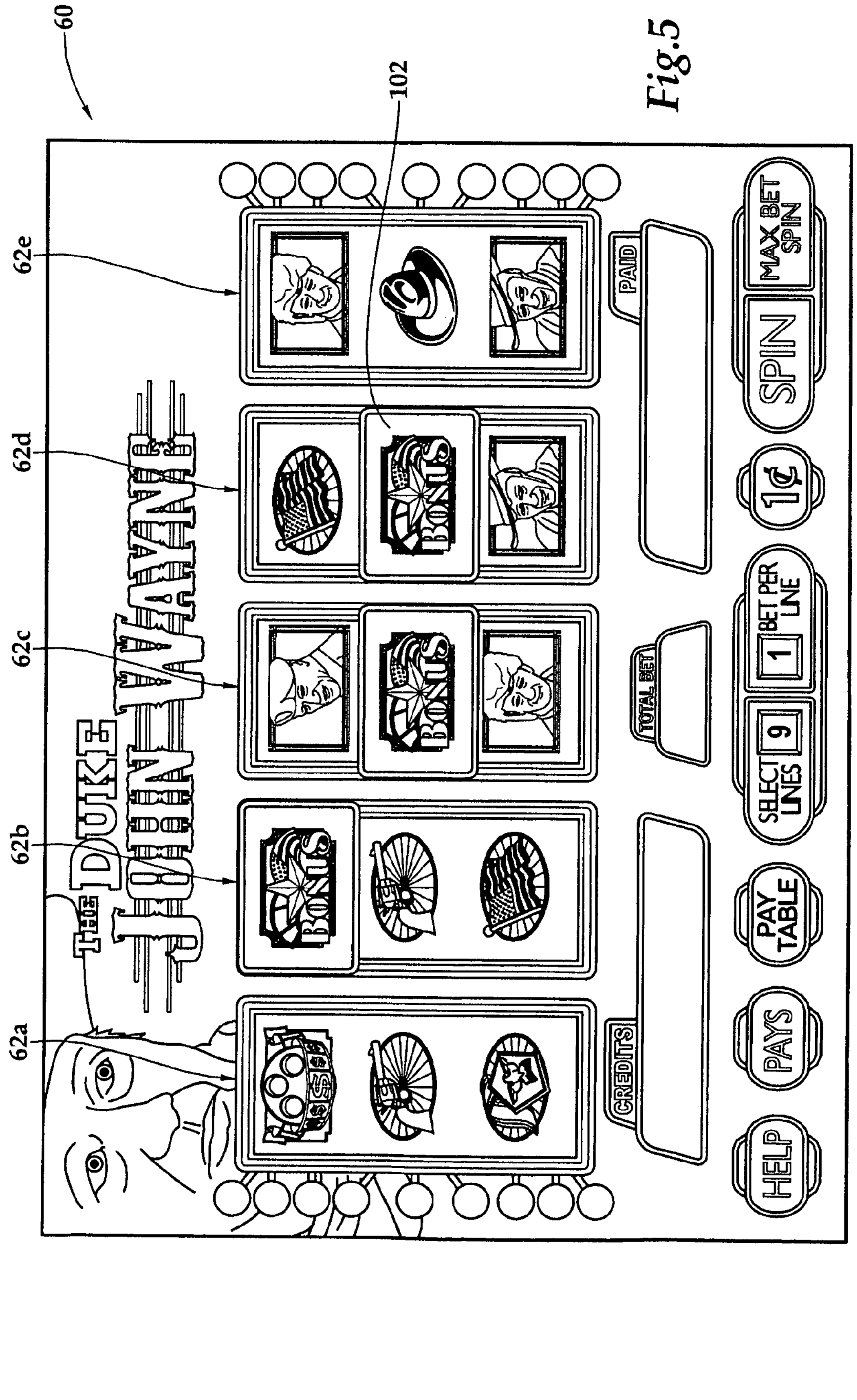
FIG. 5 is a screen view of the reels of the basic game of FIG. 4 after a play of the basic game.
Figure 6:
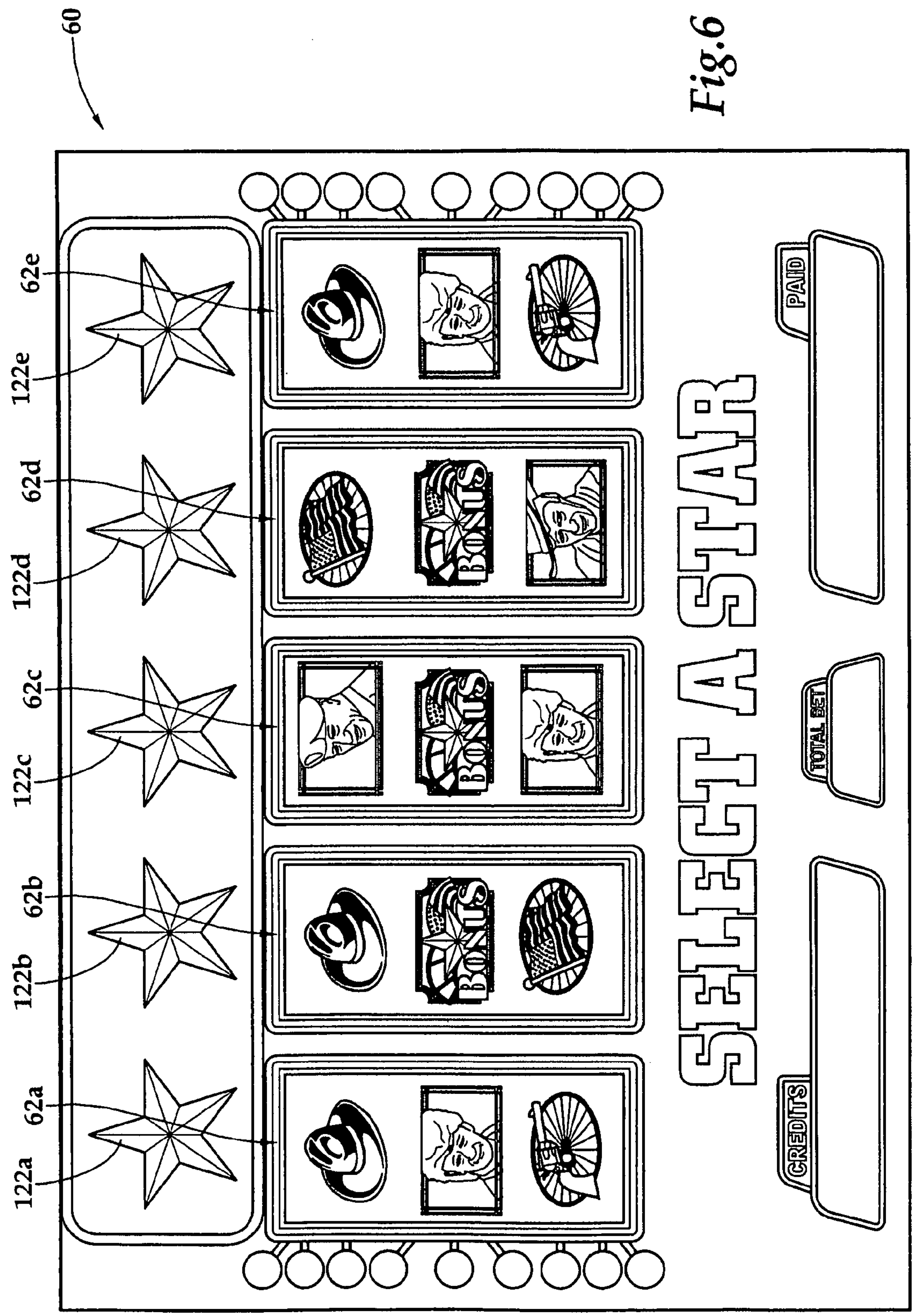
FIG. 6 is a screen view including a bonus game triggered in the basic game.

Referring now to FIG. 5, the reels 62*a-e* are displayed after they have been spun during a play of the basic game. Three BONUS symbols 102 have appeared on the reels 62*a-e*. Thus, the bonus game is triggered providing the player an opportunity to earn the low-level local area progressive. Referring now to FIG. 6, the bonus game is displayed on the main game screen 60, above the reels 62*a-e*. However, the bonus game may appear in a different location on the main game screen 60 or may also appear on the main game screen 60 without the appearance of the reels 62*a-e*. In other embodiments, the bonus game may appear on the secondary display 16. The bonus game may be displayed via the transmissive display 54 superimposed over the reels 62*a-e*, which may be mechanical reels displayed on the primary display 14.

In the illustrated embodiment, the bonus game is a picking game where a player picks one out of five elements to determine whether or not he or she earns the triggered progressive jackpot (low-level progressive in this case). In this case, the picking elements are stars 122*a-e*, but may take other forms. Additionally, while five picking elements 122*a-e* are illustrated, more or less picking elements 122*a-e* may be provided in other embodiments. Although, the bonus game is described herein as a picking game, the bonus game may include other secondary games in accordance with the present invention.

Upon selection, the stars 122*a-e* reveal either a credit amount or the low-level local area progressive award. In some embodiments, the stars 122*a-e* may also reveal other types of awards, such as free spins or other consolation prizes.

In some embodiments, the odds of the player winning the local area progressive award in the bonus game is dependent on the amount of the player's bet in the basic game. For example, if the player bets only one coin per line, then the picking game will have only one progressive winning element and four consolation prizes. If the player bets two coins per line, then the picking game will have two progressive winning elements and three consolation prizes and so forth. A player who places a maximum bet (5 coins per line) in the basic game does not play the bonus game. Rather, the player automatically wins the progressive award in the basic game upon the display of the triggering mechanism. Thus, in this case, if the player placed the maximum bet (i.e., 5 coins per line), he or she would have automatically won the low-level local area progressive award without playing the picking game.

Figure 7:
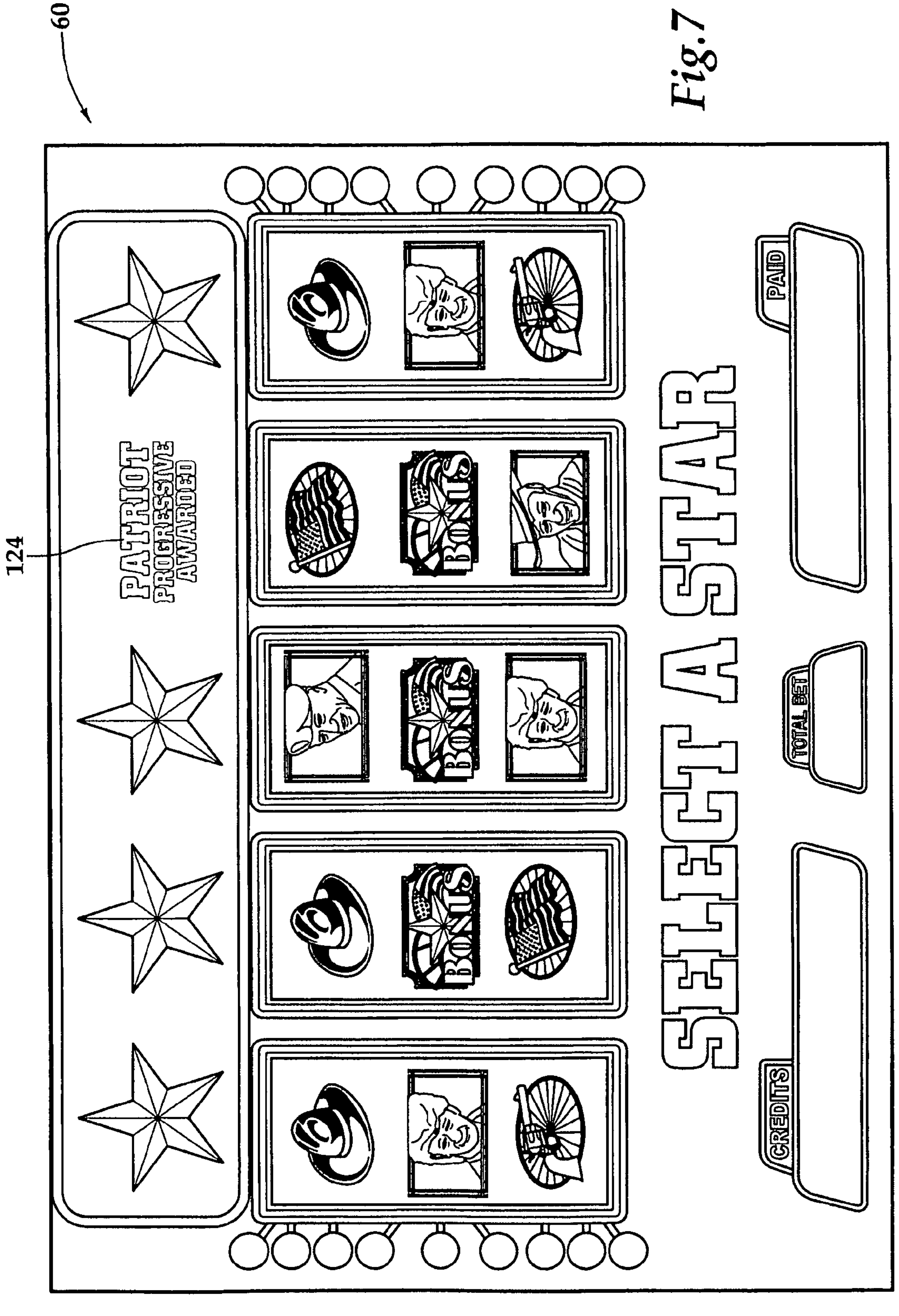
FIG. 7 is a screen view including the bonus game of FIG. 6 after a play of the bonus game.

Referring now to FIG. 7, the player was not playing the maximum bet (yielding an automatic local area progressive win) and has selected the fourth star 122*d*, which revealed a “Patriot” progressive award 124. The “Patriot” progressive award 124 is the low-level award because the picking game was triggered with three BONUS symbols 102, as described above. Had the bonus game been triggered with four BONUS symbols 102, a “Hero” progressive award (mid-level progressive award) could have been won. If the bonus game was triggered with five BONUS symbols 102, a “Legend” progressive award (high-level progressive award) could have been won. As mentioned above, the high-level award is larger than the mid-level award, which is in turn larger than the low-level award.

Figure 8:
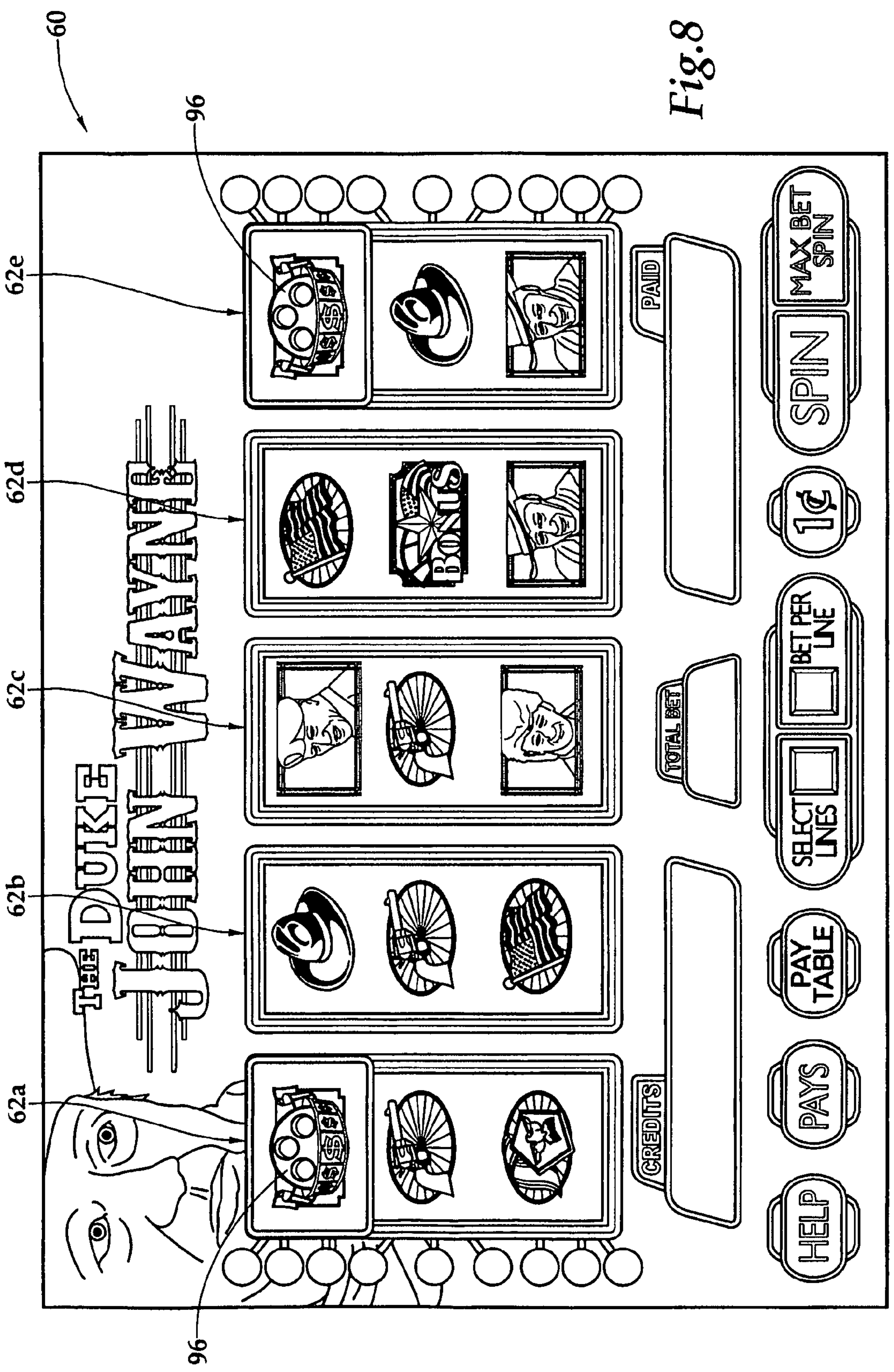
FIG. 8 is a screen view of basic game after an additional play of the basic game.

Other games may also be triggered during play of the basic game. In one embodiment, a free spin game may be triggered based on certain symbol combinations from the basic game. One type of symbol combination contemplated to trigger the free spin game is the appearance of the GOLD MOVIE REEL symbol 96 on the first reel 62*a* and the fifth reel 62*e*. However, other symbol combinations may also trigger the free spin game. Referring now to FIG. 8, the reels 62*a-e* have been spun after another play of the basic game. As illustrated, the GOLD MOVIE REEL symbol 96 has appeared on the first and fifth reels 62*a*, 62*e*. Thus, the free spin game has been triggered.

Figure 9:
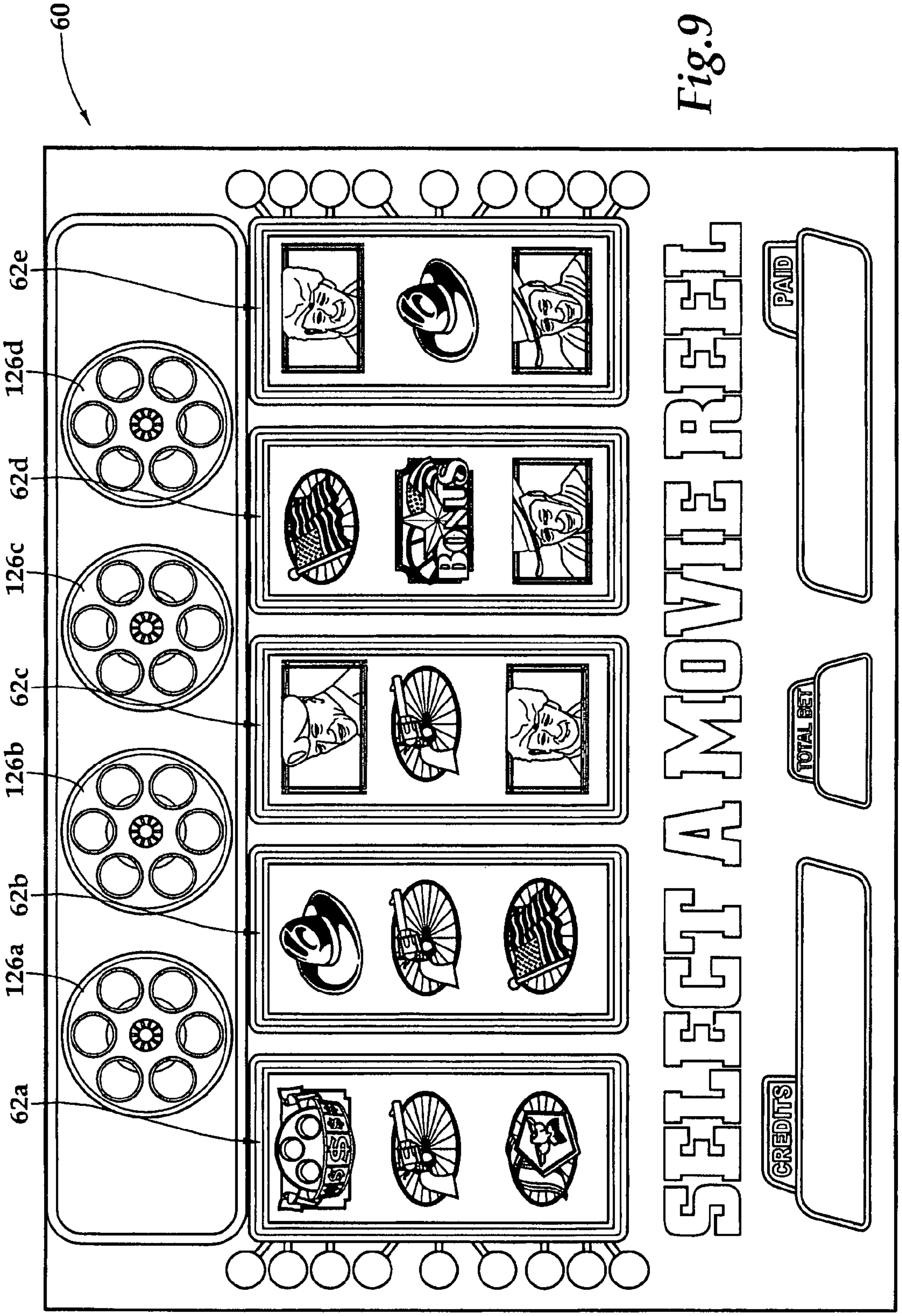
FIG. 9 is a screen view including a free spin game triggered in the basic game.
Figure 10:
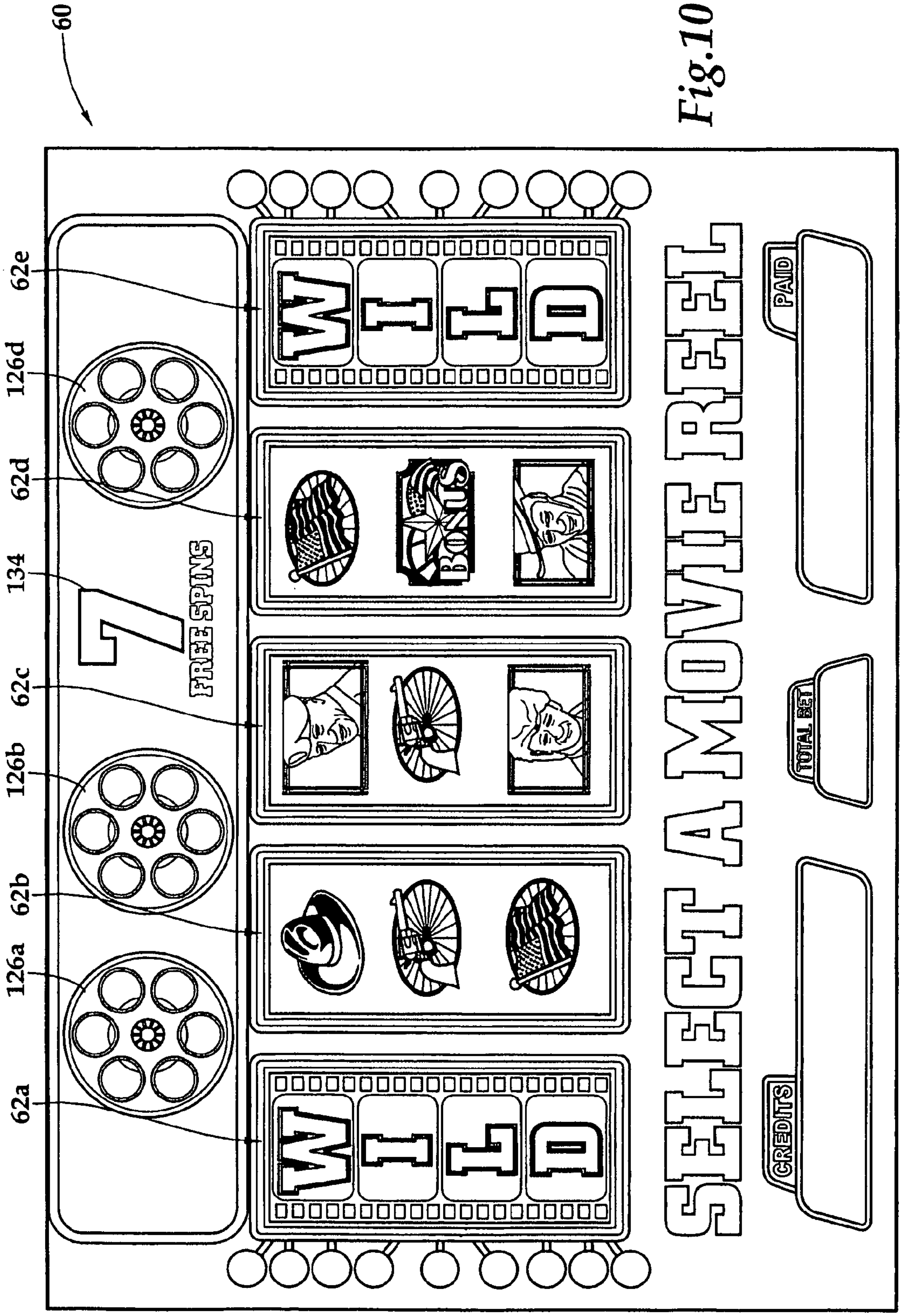
FIG. 10 is a screen view including the free spin game of FIG. 8 after a play of the free spin game.

In FIG. 9, an initial segment of the free spin game is displayed on the main game screen 60, above the reels 62*a-e*. In the illustrated embodiment, this initial segment of the free spin game is a picking game where a player picks one out of four elements (i.e., movie reels 126*a-d*) to determine the number of free spins the player receives. The free spin bonus game may be displayed via the reels 62*a-e* themselves, the transmissive display 54 superimposed over the reels 62*a-e*, or some combination thereof. Referring to FIG. 10, the player has selected movie reel 126*c* to reveal a free spin award 134. In this case, seven free spins have been awarded. In one embodiment, reel 62*a* and reel 62*e* will lock and become wild during the earned free spins, as illustrated.

It should be noted that the local area progressive award can be triggered during the free spins. For example, still referring to FIG. 10, assume the player has caused the reels 62*b-d* to spin as one of the earned free spins. The wilds locked on the first and fifth reels 62*a* and 62*e* may act as any other symbol to assist in the formation of winning combinations. For example, the locked wilds on reels 62*a,e* may act as BONUS symbols 102 to assist in triggering the picking games. Thus, the low-level picking game is triggered by the appearance of one BONUS symbol 102 on any of the reels 62*b-d*. Likewise, the mid-level picking game is triggered by the appearance of two BONUS symbols 102 on the reels 62*b-d* and the high-level picking game is triggered by the appearance of three BONUS symbols 102 on the reels 62*b-d*.

In some embodiments incorporating the present invention, both the wide area progressive and the local area progressive can be triggered in multiple ways. For example, as explained above, one way the wide area progressive can be earned is by a certain symbol combination in the basic game (e.g., when five DUKE PROGRESSIVE 106 symbols appear along an active payline). Additionally, a different symbol combination may trigger a bonus game (e.g., picking game) where the player can win the wide area progressive award in another way (e.g., picking an element to reveal the award). This same concept can apply to the local area progressive award. For example, a predetermined symbol combination in the basic game automatically triggers the award, while a different predetermined symbol combination triggers a bonus game providing an opportunity to win the local area progressive award in another way (e.g., picking an element to reveal the award).

Each of these embodiments and obvious variations thereof is contemplated as falling within the spirit and scope of the claimed invention, which is set forth in the following claims.

What is claimed is:

1. A method of conducting a wagering game allowing an opportunity to achieve a first progressive award and a second progressive award, the method comprising:

receiving a primary wager from a player, on a wagering game machine, for playing the wagering game;

initiating the wagering game on the wagering game machine;

displaying, on a display, a randomly selected outcome of the wagering game via a plurality of symbols selected from a set of symbols including a predetermined symbol;

in response to the randomly selected outcome including a first number of the same predetermined symbol, triggering an event in which a first set of potential awards including the first progressive award can be achieved; and in response to the randomly selected outcome including a second number of the same predetermined symbol, triggering an event in which a second set of potential awards including the second progressive award can be achieved, the first set of potential awards being different than the second set of potential awards.

2. The method of claim 1, wherein the first and second progressive awards are local area progressive awards funded by a portion of the primary wagers received from a plurality of gaming machines.

3. The method of claim 2, wherein the second number is larger than the first number and the second progressive award is larger than the first progressive award.

4. The method of claim 3 further comprising triggering an event in which a third progressive award can be achieved in response to the randomly selected outcome including a third number of the predetermined symbols, wherein the third number and the third progressive award are larger than the second number and the second progressive award.

5. The method of claim 1, wherein the event, triggered in response to the randomly selected outcome including the first number of the same predetermined symbol, includes a plurality of player-selectable elements, at least one of the player-selectable elements being associated with the first progressive award when the randomly selected outcome includes the first number of the same predetermined symbol, and wherein the different event, triggered in response to the randomly selected outcome including the second number of the same predetermined symbol, includes the plurality of player-selectable elements, at least one of the player-selectable elements being associated with the second progressive award when the randomly selected outcome includes the second number of the same predetermined symbol.

6. The method of claim 5, wherein other ones of the player-selectable elements are associated with consolation prizes.

7. The method of claim 5, wherein the probability of achieving the first or second award increases as the primary wager increases.

8. The method of claim 7, wherein in response to the randomly selected outcome including the first number of the predetermined symbols or the second number of the predetermined symbols, the respective first or second progressive award is automatically achieved without triggering the event when the primary wager is a maximum amount.

9. The method of claim 1, wherein the wagering game includes a free-spin bonus game including a plurality of player-selectable elements being associated an awardable number of free spins.

10. The method of claim 9, wherein the free-spin bonus game is triggered from a predetermined symbol combination in a basic game of the wagering game and the event for achieving the progressive award is triggered during the free spins awarded from the free-spin bonus game.

11. The method of claim 1, wherein the second number is greater than the first number, the first progressive award has a first value, the second progressive award has a second value, and the second value is greater than the first value.

12. The method of claim 1, further comprising in response to the randomly selected outcome including a first number of the same predetermined symbol and a wild symbol, triggering the event in which the second progressive award can be achieved.

13. A method of conducting a wagering game associated with a plurality of progressive award levels, comprising:

receiving a primary wager on a wagering game machine;

initiating a basic game of the wagering game on the wagering game machine;

displaying, on a display, a plurality of symbols arranged in an array, the plurality of symbols being selected from a set of symbols including at least one predetermined symbol; and determining a level of a progressive award from the plurality of progressive award levels based on the number of displayed predetermined symbols in the basic game; and after determining the level of the progressive award, initiating a bonus game providing an opportunity to achieve the progressive award.

14. The method of claim 13, wherein the progressive award levels are local area progressive awards funded by a portion of the primary wagers received from a plurality of gaming machines.

15. The method of claim 13, wherein the plurality of progressive award levels are associated with a local area progressive game and further comprising awarding a second progressive award if a predetermined symbol combination is displayed in the basic game, the second progressive award being associated with a wide area progressive game.

16. The method of claim 15, wherein the predetermined symbol combination is five wide-area-progressive symbols being aligned along an active payline.

17. The method of claim 13, wherein the bonus game includes a plurality of player-selectable elements, at least one of the player-selectable elements being associated with a level of the plurality of progressive award levels depending on the number of displayed predetermined symbols.

18. The method of claim 17, wherein the other ones of the player-selectable elements are associated with consolation prizes.

19. The method of claim 13, wherein a first level of the plurality of progressive award levels is associated with the display of three of the predetermined symbol anywhere in the array.

20. The method of claim 19, wherein a second level of the plurality of progressive award levels is associated with the display of four of the predetermined symbol anywhere in the array.

21. A gaming system for playing a wagering game allowing an opportunity to achieve a plurality of progressive award levels comprising:

a wager input device for receiving a primary wager to play a game of the wagering game; and a display for displaying a randomly selected outcome of the game, the randomly selected outcome being indicated by a plurality of symbols arranged in an array, the plurality of symbols being selected from a set of symbols, at least one of the symbols in the set being a predetermined symbol, wherein the opportunity to achieve a level of the plurality of progressive award levels is based on a number of the predetermined symbols displayed in the randomly selected outcome, the progressive award level corresponding to the number of the predetermined symbol in the randomly selected outcome, the progressive award level being determined prior to the opportunity.

22. The gaming system of claim 21, wherein the progressive award levels are local area progressive awards funded by a portion of the primary wagers received from a plurality of gaming terminals.

* * * * *